United States Patent [19]

Greene

[11] 4,067,083
[45] Jan. 10, 1978

[54] COMPOSITE CASTER

[75] Inventor: Frederick C. Greene, St. Joseph, Mich.

[73] Assignee: Shepherd Products U.S. Inc., St. Joseph, Mich.

[21] Appl. No.: 741,474

[22] Filed: Nov. 12, 1976

[51] Int. Cl.$^2$ ............................................. B60B 33/00
[52] U.S. Cl. ......................................................... 16/45
[58] Field of Search .................... 16/45, 46, 47, 18 A, 16/18 R

[56] References Cited
FOREIGN PATENT DOCUMENTS

| 2,330,616 | 12/1974 | Germany | 16/47 |
| 987,413 | 3/1965 | United Kingdom | 16/45 |
| 1,106,198 | 3/1968 | United Kingdom | 16/45 |
| 1,386,593 | 3/1975 | United Kingdom | 16/45 |

Primary Examiner—Dorsey Newton
Attorney, Agent, or Firm—McWilliams & Mann

[57] ABSTRACT

A composite caster comprised of an insert made from a thermo-plastic material, such as nylon, having certain characteristics and a tread portion made from a second type of plastic material, such as urethane, having different characteristics, with the tread portion molded directly onto the insert to provide an integrated whole, with the insert formed with rim elements having positive interlocking relationships with the molded on tread portion.

2 Claims, 5 Drawing Figures

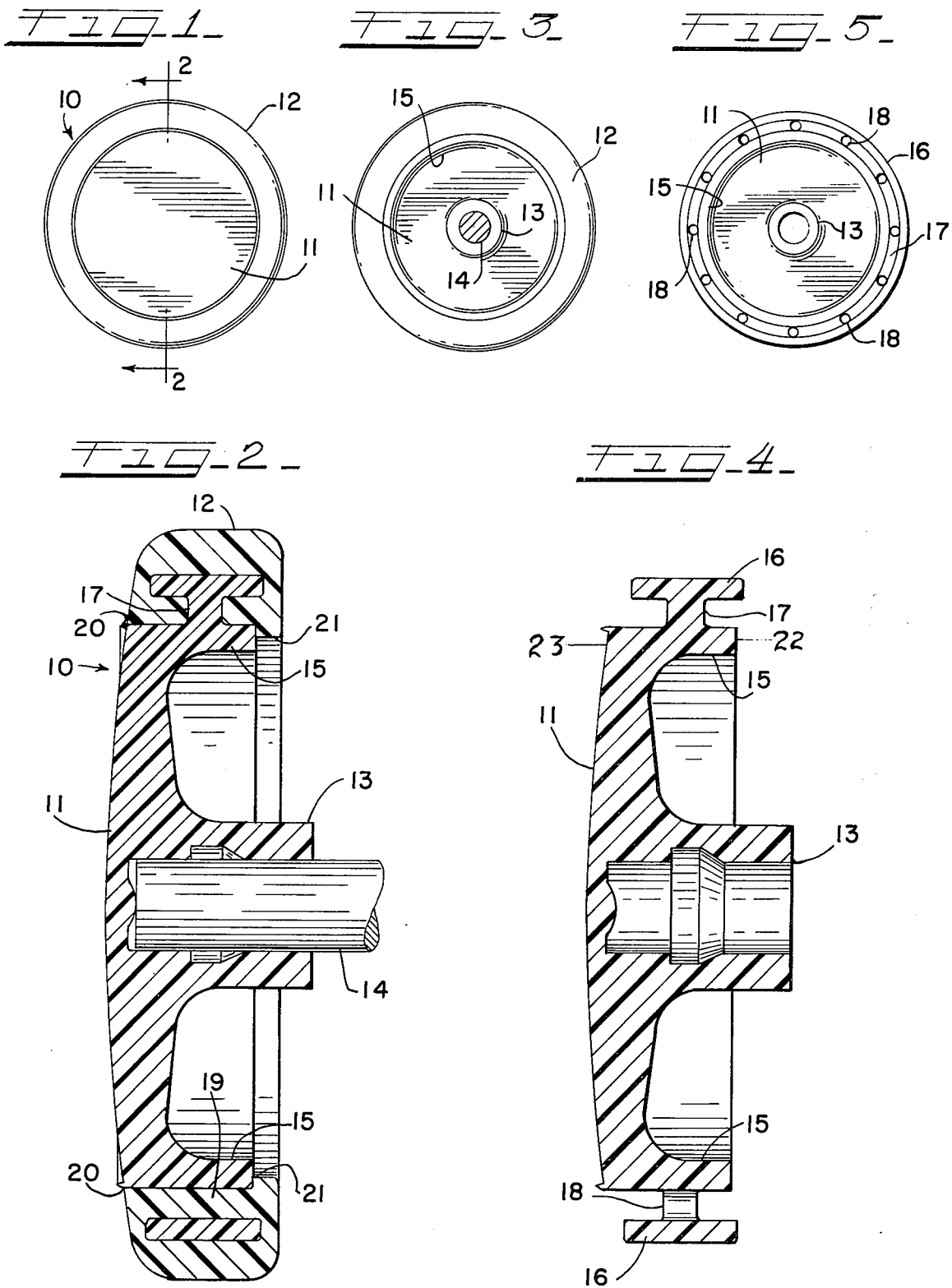

COMPOSITE CASTER

BACKGROUND OF THE INVENTION

Prior art casters, or rollers have been provided with relatively soft tread portions made from rubber or plastic materials such as neoprene, secured on a wheel element in order to provide a rolling surface which would not damage a floor surface or create streaks, or marks, on such floors having a polished surface. Such rollers were subject to problems with the tread separating from the wheel whereupon it became necessary to discard the roller and replace it with a new one. The tread portions were subject to constant wear where the roller might be utilized in heavy duty service and consequently wore quite rapidly and again required replacement.

Such rollers, because of their problems, necessitated a constant maintenance program and the tread portion, which comprised the floor engaging element became rough as they become worn and consequently aggravated the problem of scuffing the floor. Further, such soft tread portions deteriorated with age and frequently became loose and thus it was possible for the tread to separate from the wheel and when this happened the floor was immediately damaged and this, of course, was an annoyance to the user as well as an expense and resulted in complaints to the dealer who had to replace the roller.

SUMMARY OF THE INVENTION

This invention provides a composite caster comprised of a center insert and an applied tread portion which become integrated and wherein the insert may be made from a plastic material having high strength, a high resistance to fracture and which resists any tendency to deform under load.

The tread portion is also made from a suitable plastic material, having different characteristics, which afford quiet rolling of the caster on a hard surface such as tile, or a hardwood floor, but which is also adapted to roll readily on cushioned surfaces, such as rugs or carpets and which also is resistant to excessive wear and capable of carrying the maximum load to which the caster might be subjected, without vibration and with a minimum of friction.

The center insert is provided with a rim spaced from the body of the insert and integrally connected thereto by a central web which is provided with through openings in the web spaced at intervals around the web. The tread portion is molded directly onto the rim and in this process the plastic material of the tread flows under the rim and through the openings in the web to provide a side-to-side connection and a positive interlocked relationship with the center insert. The tread portion in effect thus becomes an integral part with the center insert and affords a caster having the required strength and wear properties.

OBJECTS OF THE INVENTION

The primary purpose of the invention is to provide a caster of simplified design having the required strength and rolling characteristics provided in a caster made from thermoplastic materials combined in a manner to afford the desired properties.

The principal object of the invention is the provision of a composite caster comprised of a center insert cast, or molded, of a suitable plastic material having the desired strength and load supporting characteristics and a tread portion molded directly onto the insert and comprising a suitable plastic material having different characteristics, affording the desired rolling and load carrying properties.

An important object of the invention is to provide a composite caster comprised of a center insert and a tread portion each made from a suitable plastic material wherein the tread portion is molded onto the center insert and interlocked therewith to provide an integrated caster structure.

Another object of the invention is the provision of a composite caster comprised of a center insert and a tread portion made from suitable plastic materials wherein the tread portion is molded onto and under a rim of the center insert through a perforate web connecting the rim with the central body of the insert to provide an integrated interlocking relationship between the insert and tread portions.

A further object of the invention is to provide a composite caster comprised of a center insert and a separate tread portion molded onto the center insert to provide an integrated caster structure wherein the center insert is made from a nylon plastic material and the tread portion is made from urethane plastic.

DESCRIPTION OF THE DRAWINGS

The foregoing and other and more specific objects of the invention are attained by the composite caster construction and arrangement illustrated in the accompanying drawings wherein:

FIG. 1 is an elevational view of a composite caster constructed according to this invention showing the center insert and surrounding tread portions;

FIG. 2 is a vertical sectional view through the composite caster taken on the line 2—2 of FIG. 1;

FIG. 3 is an elevational view of the inner side of the composite caster;

FIG. 4 is a detail sectional view similar to FIG. 2 through the central body insert member showing the inner and outer annular rims connected by a central web; and FIG. 5 is an inside elevational view of the central body insert showing the perforate nature of the central connecting web between the rims.

DESCRIPTION OF PREFERRED EMBODIMENT

In the drawings 10 represents generally a caster having a central body portion 11 and a tread portion 12. A central hub structure 13, integral with the body portion 11 provides for the mounting of an axle 14 by means of which the caster is operatively mounted as a rolling support for the article upon which it is used. The central body portion 11 is generally disc-like, having a slightly convex face for pleasing appearance. The disc-like body 11 comprises an insert in relation to the tread 12 and is provided with an inwardly directed inner annular rim 15 integral with the body 11.

An outer annular rim 16 is disposed about the rim 15 in spaced concentric relation thereto and is integrally connected with the inner rim by a central web 17. This center insert 11 is made from a suitable thermoplastic material and it has been found that a nylon, such as Zytel 408, affords the properties essential in a caster part of this type in that it provides the required strength and load supporting qualities and the resistance to fracture necessary in the service to which a caster of this type is subjected.

The central web 17 comprises a perforate wall between the rims 15 and 16, having openings 18 extending therethrough at equally spaced intervals around the insert member and supports the outer annular rim 16 on the inner rim 15. The outer rim and web 17 constitute what might be described as a T-section and afford means for integrally connecting the tread portion 12 with the center insert 11 in a manner whereby the parts are positively interlocked against any possibility of separation. The plastic material of the tread portion 12 is molded directly onto the completed insert member 11 and in this process the material flows around and under the outer rim 16 and through the openings 18 so that the tread material is effectively integrated with the central body portion.

The tread material underlying the outer rim 16 affords an effective interlocking engagement with that rim and the tread material flowing through the web openings 18 provides an effective connection 19 between the material upon opposite sides of the web 17, whereby to provide a very effective interlocking relationship against any possibility of separation in either a vertical or a horizontal direction. At the outer face of the caster 10 the tread material 12 is disposed substantially flush with a slight projection 20 extending outwardly from the face of the central body disc portion 11, as best shown in FIG. 2. The projecting portion 20 forms an annular ring for the purpose of providing a seal to stop tread material from flowing over the face of the insert 11 during application of the tread material 12 in a mould cavity. Annular seal ring 20 will be flattened by an amount necessary to effect a seal for tread material 12 and provides for slight variations in insert and mould cavity dimensions across width 22 to 23 without apparent distortion of insert 11. At the inner side of the caster tread material 12 is formed to provide a lip, or flange 21, overlying the inside edge of the annular inner rim 15, thus further to provide a connection between the tread and the center insert which is strongly resistant to displacement, or separation.

The center insert member 11 is relatively rigid, being made from a material, such as nylon, which affords the qualities of strength and rigidity essential to a strong caster adapted to withstand the forces encountered in heavy duty service. However, the tread made from a material such as urethane and whereas the center insert is hard and rigid the tread molded onto the insert has durometer reading of 85/90 so that the finished caster will have the rolling qualities desired and will not scratch or mar the surfaces upon which it is used.

What is claimed is:

1. A composite caster comprised of a center insert and a separate tread portion, the insert and tread portions being made from plastic materials having respectively different characteristics, said tread portion being molded directly onto the center insert, and said center insert having means interengaging with the tread portion to prevent separation of the tread from the insert, said center insert comprising a generally disc-like body having a central hub and an annular rim in spaced relation to the hub, said annular rim including a free edge and said interengaging means comprising an outer rim concentric with said annular rim, and a central web comprising a vertical wall integrally connecting said outer rim with said annular rim, said molded tread portion extending over the outer rim and engaged with said central web under the outer rim whereby the outer rim and central web are fully enclosed by the tread portion, said tread portion overlying at least a portion of the free edge of said annular rim, and an annular projection of said disc-like body extending outwardly from the face of the body forming an annular ring adjacent the peripheral edge of said body to provide a seal preventing the tread portion from extending over the face of the body.

2. A composite caster as set forth in claim 1 wherein said tread portion is disposed substantially flush with said disc-like body as defined by said annular ring and projects beyond said outer rim and the annular rim at the opposite side of the caster.

* * * * *